A. P. Barlow.
Saw Mill.
N° 84,851. Patented Dec. 15, 1868.

Witnesses

UNITED STATES PATENT OFFICE.

ASHBEL P. BARLOW, OF ST. JOHN, CANADA.

IMPROVEMENT IN SLIDES FOR HANGING UPRIGHT SAWS.

Specification forming part of Letters Patent No. 84,851, dated December 15, 1868.

*To all whom it may concern:*

Be it known that I, ASHBEL P. BARLOW, a citizen of the United States, now a resident of St. John, New Brunswick, Dominion of Canada, have invented a new and Improved Method of Hanging Upright Saws, which gives them a new and improved motion; and I do hereby declare that the following is a full and exact description thereof, reference being had to the accompanying drawings and to the letters of reference marked thereon.

The nature of my invention consists in the construction of the slides of the upper muley-blocks of saw-mills, which give and control the relative positions of the saw, with the log being sawed, at all points of the reciprocation of the saw.

To enable others skilled in the art to make and use my invention, I will proceed to describe its construction and operation.

Figure 1:
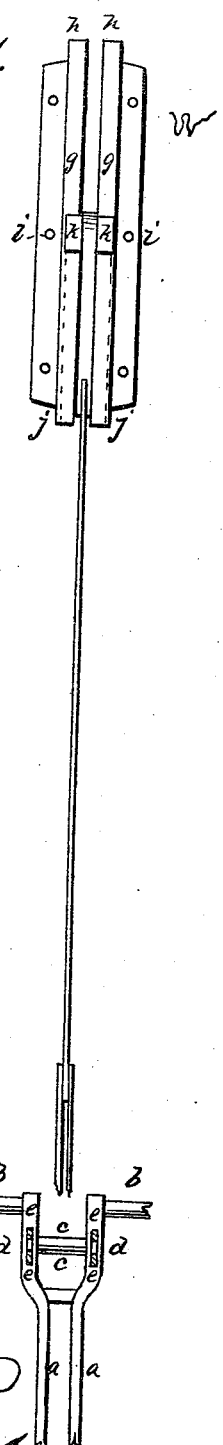
Figure 2:
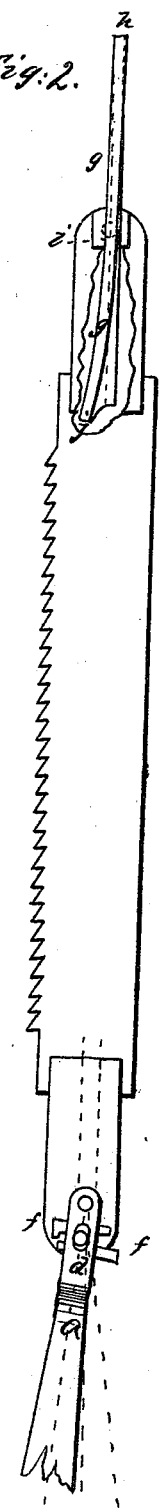
Figure 3:

Figure 1 in drawing is the front view of slides with saw attached; Fig. 2, side view of slides with saw at forward center. Fig. 3 shows different positions of saw while in motion, as imparted by my improved construction of slides.

It is a well-known fact in the sawing of lumber, with an upright reciprocating saw, that it cuts much easier, and consequently faster, with the same power, by so constructing the slides upon the upper muley-blocks that the upper end of the saw changes in its position, in its reciprocations, with relation to the perpendicular line; and, by my construction, as will be seen, the saw, when it begins to descend in its downward reciprocation, only slightly changes its position from the perpendicular line from its starting-point at $h$ till it gets one-half way, more or less, in its descent, and at the point $i$, when, instead of continuing to the extent of its downward reciprocation in an inclined line it is changed to a curved direction to point $j$, which curved slide will cause a continual change of relative position of the saw with the wood being sawed, and the position that the teeth have in cutting the wood; and, as seen in Fig. 3, the saw, as it commences its downward motion, commences to cut the wood with its lower teeth, and as it advances, by the slight inclination of the slide, the teeth higher upon the saw are brought in contact with the wood till at the point of half its downward reciprocation, more or less, where the forward curvature of the slide commences, the upper end of the saw is thrown still more forward, and is increased continually by reason of the curved surface of the slide to the lower point of its reciprocation, and the crank in its revolution has caused the saw to make an upward reciprocation, where the saw suddenly leaves the contact with the wood, and is free to rise without any impediment; or the upper part of the slide, from $h$ to $i$, may be perpendicular, and not depart from my invention.

In the drawings, $g$ $g$ represent the faces of two parallel slides, which are attached to the muley-block in any convenient and safe manner, and so that they can be adjusted laterally. These slides are constructed in the manner represented in all the figures, $h$ being the upper end of such slides, and having the face straight and slightly inclined forward in descending to or near the point $i$, when the right line is changed into a curved line, from $i$ to the terminus $j$.

Fig. 3 shows the different positions of the line of cut for the saw at its different points of reciprocation.

$k$ is a cross-head, such as is usually employed to guide the saw upon the slides $g$, except that it is made more convex on the surfaces that come in contact with the slides, to easily pass over the point of intersection of the inclined right line to the curved line.

I am aware that circular slides have been used, by which the position of the saw is governed, and I do not claim such curved lines, as such curve alone does not give the desired position to the saw at its different points of reciprocation; and I am also aware that slides having two different inclinations on the same face have been used, such having been patented to me in patent No. 72,155. Neither of these improvements do I claim; but What I do claim, and desire to secure by Letters Patent, is—

The slides $g$ $g$ of a muley-block for a saw-mill, when constructed with a straight inclined or straight perpendicular surface, and a curved surface, in the manner and for the purpose substantially as described.

ASHBEL P. BARLOW.

Witnesses:
 G. F. KEANS,
 F. W. WISDOM.